United States Patent [19]

Ehlers

[11] 4,155,573
[45] May 22, 1979

[54] ELASTIC PIPE CONNECTOR

[75] Inventor: Karlheinz Ehlers, Hamburg, Fed. Rep. of Germany

[73] Assignee: Continental Gummi-Werke Aktiengesellschaft, Hanover, Fed. Rep. of Germany; a part interest

[21] Appl. No.: 811,698

[22] Filed: Jun. 30, 1977

[30] Foreign Application Priority Data

Jun. 30, 1976 [DE] Fed. Rep. of Germany ....... 2629348

[51] Int. Cl.² ............................................. F16L 51/02
[52] U.S. Cl. .................................. 285/229; 285/363; 285/423
[58] Field of Search ................. 285/229, 226, 110, 99, 285/111, 363, 423; 138/109, 121, 127, 133, 173, 174

[56] References Cited

U.S. PATENT DOCUMENTS

| 3,666,296 | 5/1972  | Fischetti | 285/229 X |
| 3,761,114 | 9/1973  | Blakeley  | 285/111   |
| 3,985,378 | 10/1976 | Muller    | 285/229   |
| 4,026,585 | 5/1977  | Berghofer | 285/229   |
| 4,036,512 | 7/1977  | Francis   | 285/111   |

FOREIGN PATENT DOCUMENTS 1253532 11/1967 Fed. Rep. of Germany ........... 285/229

Primary Examiner—Dave W. Arola
Attorney, Agent, or Firm—Becker & Becker, Inc.

[57] ABSTRACT

An elastic pipe connector comprising a bellows body made of rubber or rubber-like synthetic material and having angled-off end beads and reinforcing inserts which extend between the end beads and which comprise thread-like strength carriers, preferably of metal. The reinforcing inserts are angled off at the end of the end beads and with a plurality of directional changes are embedded in the end beads.

7 Claims, 3 Drawing Figures

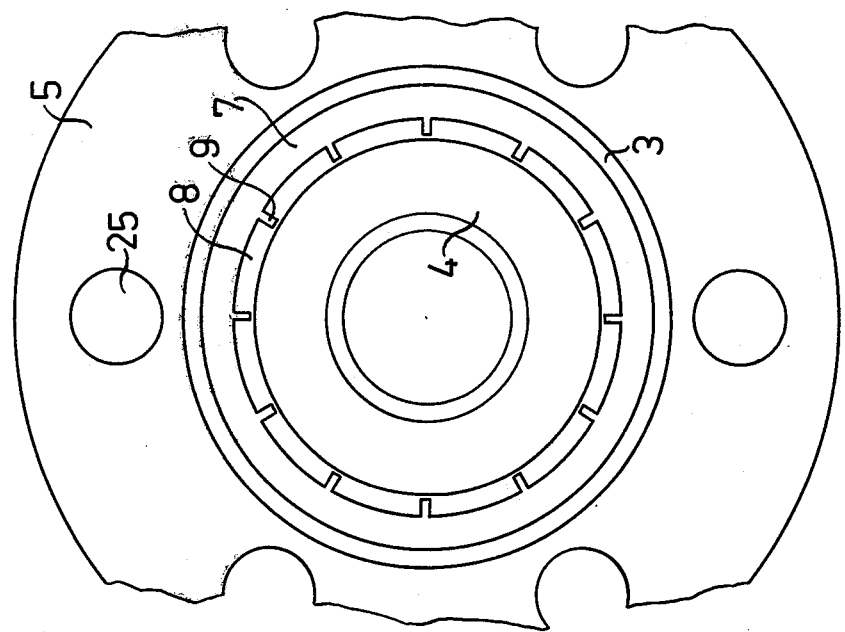
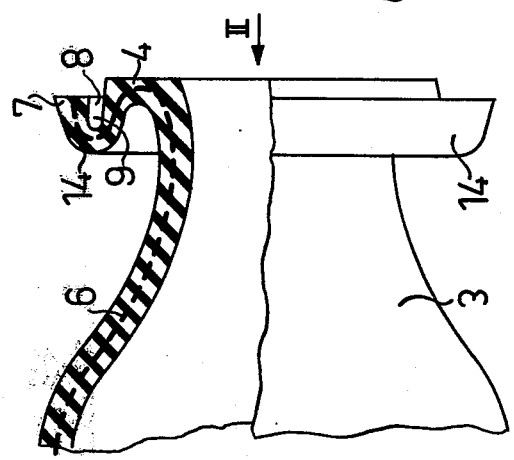
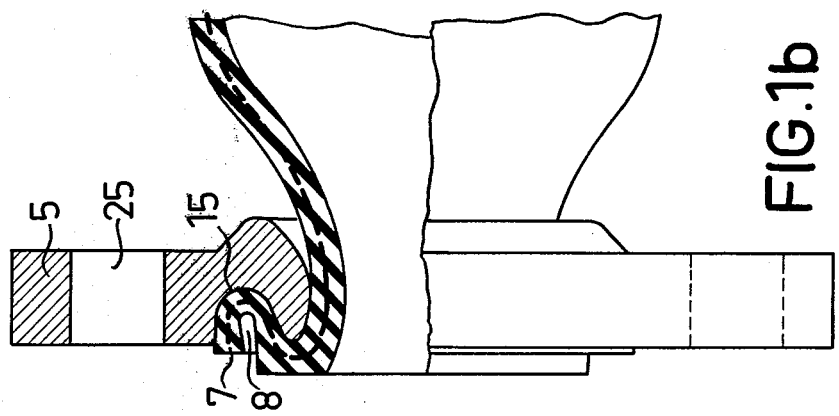

ELASTIC PIPE CONNECTOR

The present invention relates to an elastic pipe connector comprising a bellows body made of rubber or rubber-like synthetic material and having angled-off end beads and reinforcing inserts which extend between the end beads and which comprise thread-like strength carriers, preferably metallic wires, strands or cables.

Elastically deformable connecting pieces for absorbing and equalizing longitudinal changes and angular adjustments in rigid conduits are known and are made of rubber or synthetic material bellows bodies having textile fabric plies or inserts which extend from bead to bead. The design, formation and arrangement of the insertes depends upon the respectively prevailing conduit pressures. The expected mechanical stresses also affect the selection of the inserts. In all cases it is absolutely necessary that the inserts in both end beads be securely anchored against tension forces. For this purpose, the inserts, as a rule, are looped around annular cores embedded in the end beads. Such a positive anchoring of the inserts fulfills all requirements of usage. However, with metallic reinforcing inserts, which are preferred over textile inserts for pipe connectors which are acted upon by high pressures and temperatures, the heretofore known satisfactory formation of the anchoring encounters considerable difficulties. The insert elements, which are generally steel wire strands or cables and which extend between the end beads parallel to one another without mutual contact in the axial direction or at a specific angle, can only be bent around the annular core with difficulty due to their high inherent rigidity and are constantly trying to spring back again in an uncontrollable manner. Attempts to do without the annular core and to allow the strength carriers to extend linearly into the end beads without forming loops, have led to no usable products. This is so because the connection of the strength carriers to the elastomeric material alone is not sufficient to hold the strength carriers in the end beads under load. The difficulties increase with the number of insert layers, the strength of the individual strength carriers, and in inverse proportion to the throughflow cross section. In this connection, it must be taken into consideration that the end beads serve not only for fastening the pipe connector but in addition must ensure a pressure-tight connection and therefore under all circumstances must have an uninterrupted flat end face for pressing onto the flange element of the conduit.

It is, therefore, an object of the present invention to provide a secure anchoring of the reinforcing inserts in the end beads which will suffice to absorb occurring stresses without the use of an annular core.

This object and other objects and advantages of the invention will appear more clearly from the following specification in connection with the accompanying drawing, in which:

FIG. 1a is a partial section through a pipe connector according to the present invention in a tension-free state;

FIG. 1b is a partial section through a pipe connector according to the present invention in mounted condition; and FIG. 2 is a top view of the end bead of the pipe connector of FIG. 1a taken in the direction of the arrow II.

The pipe connector pursuant to the present invention is characterized primarily in that the reinforcing inserts, which are angled off at the end of the end beads, are embedded with a plurality of directional changes in the end beads. The reinforcing inserts are advantageously embedded in outer rings which extend from the end beads in the form of elbows when viewed in axial section through the bellows body. The outer rings are radially spaced from the end beads so as to form an open annular groove therewith which is open toward the end face of the beads. In the tension-free state, the outer rings are directed against the central axis of the bellows body expediently in the form of a truncated cone-shaped mantle at an acute angle which opens toward the end faces. In the mounted condition, on the other hand, the annular rings are introduced into flange rings which are provided with corresponding receiving grooves having essentially cylindrical mantle surfaces. The flange rings also serve for fastening of the pipe connectors.

The end loops (in practice known as "Gallows loops") heretofore necessary for anchoring the strength carriers to the annular core are replaced, pursuant to the present invention, by a lateral deflection with a plurality of directional changes in the end beads or in the form-variable outer ring. The radial pressing which in the mounted condition causes the clamping-in of the outer rings into the receiving grooves of the flange ring assures the positive connection. The constantly present tendency to spring back of the relatively stiff steel cables and other metallic strength carriers can be tolerated in the tension-free state of the pipe connector, because the outer rings, which are necessary for the fastening, only receive their final shape and arrangement relative to the corresponding end beads when they are being mounted. The elbow, through the intervention of which the outer ring is connected with the beads, makes it impossible for the locally deformed strength carriers, even under extreme tension loads, to pull out of the outer rings. The sealing surface proper of the end beads remains unaffected by such tension loads and is usable for fulfilling its sealing function without disadvantageous compromises. The positive anchoring of the angled-off reinforcing inserts can be additionally ensured by the selection of an embedding material which is harder than that of the remaining bellows body.

The manufacture of the pipe connector pursuant to the present invention is considerably simplified in its entirety by doing away with the annular core and the additional work necessary for looping the reinforcing inserts around this core. The strength carriers can either be worked into the raw bellows in a preformed state or instead can be forced into their intended elbow-shape during closing of the vulcanizing mold, for example, by means of corresponding protrusions on the form plates or by means of additional filling material. It is advisable, pursuant to a further feature of the present invention, to bridge the annular grooves with a plurality of connecting webs or strips which are distributed over the periphery of the grooves in mutually spaced relationship and connect the end beads and the outer rings. These connecting strips prevent an undesirable excessive spreading of the outer rings.

Referring now to the drawing in detail, the pipe connector shown therein comprises an elastically deformable bellows body 3 with angled-off end beads 4 which are engaged from behind by metallic flange rings 5 which are slipped on earlier during the course of assembly. The bellows body 3 is made of natural or synthetic rubber in a composition determined by its purpose. The bellows body 3 is provided with one or more layers of stranded steel wires 6 which extend between the end beads 4 parallel to and at a distance from one another at an acute angle to the central axis of the bellows. In the drawing, the layer or layers of steel wires 6 are indicated by a single dash line. The stranded steel wires 6 continue through the end beads in the radial direction with numerous directional changes into a molded-on outer ring 7 which terminates in the free end face thereof or at least in the region thereof. The outer rings 7 are connected to the corresponding end beads 4 by means of an elbow or curved piece 14, when viewed in an axial section through the bellows body 3, and together therewith form an annular groove 8 which is open toward the outside. In the tension-free state shown in FIG. 1a, the outer rings 7 have truncated cone mantle shaped peripheral surfaces which widen toward the outside. In the axial direction and relative to the end bead, the outer rings 7 are dimensioned and arranged in such a way that they do not interfere with the sealing function of the end bead in the mounted state of FIG. 1b. The annular groove 8 is bridged by a plurality of connecting webs or strips 9 which are distributed over the circumference of the annular groove 8 (FIG. 2) in order to secure the outer rings 7 against excessively wide spreading under the effect of the embedded steel wires 6.

For the installation of the pipe connector into a not-shown conduit, the flange rings 5 are slid outwardly into their end position shown in FIG. 1b. In so doing, the flange rings 5 embrace the outer rings 7 in receiving grooves 15. The receiving grooves 15 have essentially cylindrical walls so that the outer rings 7 are deformed when they are pressed into the grooves and are bent radially inwardly in the direction toward the end beads 4. The final deformation takes place with the establishment of the flange connection by the tractive action of not-shown bolts which are inserted into bores 25 in the flange rings 5.

It is, of course, to be understood that the present invention is by no means limited to the specific showing in the drawing, but also encompasses any modifications within the scope of the appended claims.

What I claim is:

1. An elastic pipe connector which includes:
    a bellows-shaped body of elastomeric material having angled-off end beads;
    reinforcing inserts embedded in said body and comprising thread-like or filiform strength carriers, said reinforcing inserts being bent toward said end beads and, in a meandering state, being embedded in said end beads; and
    outer rings connected to said end beads and being elbow-shaped when viewed in an axial section through said body, said outer rings forming with the respective adjacent bead portion an annular groove which is open toward the pertaining axially outer end face surface of said body, said outer rings being spaced radially outwardly from the respective adjacent beads while encircling same, with the ends of said reinforcing inserts being embedded in said outer rings.

2. A pipe connector according to claim 1, in which said strength carriers are selected from the group of strength carriers consisting of wires, wire strands, and cables.

3. A pipe connector according to claim 1, in which said outer rings, in the unloaded condition of said bellows-shaped body, are truncated cone-shaped and have the extension of their radially outwardly lying surface form with the axis of said connector an acute angle opening toward ther pertaining end face of said bellows-shaped body.

4. A pipe connector according to claim 1, in which the axial length of said outer rings equals at least the approximate thickness of the wall of said bellows-shaped body.

5. A pipe connector according to claim 1, in which said annular grooves are bridged by connecting webs interconnecting said outer rings and respective adjacent end beads and substantially evenly distributed along a circle.

6. A pipe connector according to claim 1, which includes flange ring means for mounting said pipe connector to conduits, said flange ring means being provided with receiving opening means for receiving the outer ring of the respective end portion of said pipe connector and securing it to said flange ring means.

7. A pipe connector according to claim 1, in which those portions of said bead sections in which said reinforcing inserts meander comprise a material which is harder than the material of the remaining portions of said bellows-shaped body.

* * * * *